(12) United States Patent
Winebrand et al.

(10) Patent No.: US 10,296,146 B2
(45) Date of Patent: May 21, 2019

(54) SYSTEM AND METHOD FOR DETECTING GRIP OF A TOUCH ENABLED DEVICE

(71) Applicant: Microsoft Technology Licensing, LLC, Redmond, WA (US)

(72) Inventors: Amil Winebrand, Petach-Tikva (IL); Michael Orlovsky, Rehovot (IL); Guy Greenboim, Beit-Herut (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/977,766

(22) Filed: Dec. 22, 2015

(65) Prior Publication Data

US 2017/0177110 A1    Jun. 22, 2017

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ...... G06F 3/044; G06F 3/0412; G06F 3/0416; G06F 2203/04104
See application file for complete search history.

(56) References Cited

U.S. PATENT DOCUMENTS

| | | |
|---|---|---|
| 4,398,720 A | 8/1983 | Jones et al. |
| 4,591,710 A | 5/1986 | Komadina et al. |
| 4,672,154 A | 6/1987 | Rodgers et al. |
| 4,686,332 A | 8/1987 | Greanias et al. |
| 4,707,845 A | 11/1987 | Krein et al. |
| 4,791,592 A | 12/1988 | Burgess |
| 4,977,397 A | 12/1990 | Kuo et al. |
| 5,117,071 A | 5/1992 | Greanias et al. |
| 5,129,654 A | 7/1992 | Bogner |
| 5,239,139 A | 8/1993 | Zuta |
| 5,528,002 A | 6/1996 | Katabami |
| 5,543,588 A | 8/1996 | Bisset et al. |
| 5,574,262 A | 11/1996 | Petty |
| 5,691,512 A | 11/1997 | Obi |
| 5,825,345 A | 10/1998 | Takahama et al. |
| 5,831,600 A | 11/1998 | Inoue et al. |

(Continued)

FOREIGN PATENT DOCUMENTS

| | | |
|---|---|---|
| CN | 202092590 U | 12/2011 |
| CN | 103576997 A | 2/2014 |

(Continued)

OTHER PUBLICATIONS

Official Action dated Apr. 3, 2017 From the US Patent and Trademark Office Re. U.S. Appl. No. 15/050,656. (23 pages).

(Continued)

*Primary Examiner* — Michael J Jansen, II
*Assistant Examiner* — Yaron Cohen

(57) ABSTRACT

A device includes a display, a controller configured to control the display, a sensor integrated with the display and a circuit a circuit in communication with the sensor. The sensor is configured to sense touch input and the circuit is configured to detect when a user is gripping the device only based on output from the sensor and a pre-defined model. Gripping is reported to the controller.

14 Claims, 11 Drawing Sheets

(56) References Cited

U.S. PATENT DOCUMENTS

| | | |
|---|---|---|
| 5,841,078 A | 11/1998 | Miller et al. |
| 5,854,881 A | 12/1998 | Yoshida et al. |
| 5,859,392 A | 1/1999 | Petty |
| 5,889,511 A | 3/1999 | Ong et al. |
| 5,905,489 A | 5/1999 | Takahama et al. |
| 5,923,320 A | 7/1999 | Murakami et al. |
| 5,973,676 A | 10/1999 | Kawakura |
| 6,020,849 A | 2/2000 | Fukuzaki |
| 6,081,259 A | 6/2000 | Teterwak |
| 6,229,529 B1 | 5/2001 | Yano et al. |
| 6,239,389 B1 | 5/2001 | Allen et al. |
| 6,417,846 B1 | 7/2002 | Lee |
| 6,459,424 B1 | 10/2002 | Resman |
| 6,690,156 B1 | 2/2004 | Weiner et al. |
| 6,888,536 B2 | 5/2005 | Westerman et al. |
| 7,244,901 B1 | 7/2007 | Liao et al. |
| 7,248,249 B2 | 7/2007 | Kong et al. |
| 7,292,229 B2 | 11/2007 | Morag et al. |
| 7,372,455 B2 | 5/2008 | Perski et al. |
| 7,643,010 B2 | 1/2010 | Westerman et al. |
| 7,656,396 B2 | 2/2010 | Bosch et al. |
| 7,725,089 B2 | 5/2010 | Lee et al. |
| 7,843,439 B2 | 11/2010 | Perski et al. |
| 7,868,874 B2 | 1/2011 | Reynolds |
| 7,995,036 B2 | 8/2011 | Perski et al. |
| 8,059,102 B2 | 11/2011 | Rimon et al. |
| 8,130,203 B2 | 3/2012 | Westerman |
| 8,278,571 B2 | 10/2012 | Orsley |
| 8,289,289 B2 | 10/2012 | Rimon et al. |
| 8,305,358 B2 | 11/2012 | Klinghult et al. |
| 8,402,391 B1 | 3/2013 | Doray et al. |
| 8,420,958 B2 | 4/2013 | Lu et al. |
| 8,446,374 B2 | 5/2013 | Westerman |
| 8,482,545 B2 | 7/2013 | King-Smith et al. |
| 8,542,210 B2 | 9/2013 | Westerman |
| 8,660,978 B2 | 2/2014 | Hinckley et al. |
| 8,810,542 B2 | 8/2014 | Yousefpor |
| 8,823,664 B2 | 9/2014 | Kyrynyuk et al. |
| 8,994,692 B2 | 3/2015 | Yumoto et al. |
| 9,035,905 B2 | 5/2015 | Saukko et al. |
| 9,262,010 B2 | 2/2016 | Bulea |
| 9,367,168 B2 | 6/2016 | Ahn et al. |
| 9,495,052 B2 | 11/2016 | Shepelev |
| 9,626,020 B2 | 4/2017 | Durojaiye et al. |
| 9,632,622 B2 | 4/2017 | Hotelling et al. |
| 2002/0089491 A1 | 7/2002 | Willig |
| 2003/0080946 A1 | 5/2003 | Chuang |
| 2004/0027340 A1 | 2/2004 | Muraoka et al. |
| 2004/0100450 A1 | 5/2004 | Choi |
| 2004/0155871 A1 | 8/2004 | Perski et al. |
| 2004/0160426 A1 | 8/2004 | DeGroot et al. |
| 2004/0178995 A1 | 9/2004 | Sterling |
| 2005/0189154 A1 | 9/2005 | Perski et al. |
| 2005/0271259 A1 | 12/2005 | Lorch et al. |
| 2006/0012580 A1 | 1/2006 | Perski et al. |
| 2006/0017709 A1 | 1/2006 | Okano |
| 2006/0097991 A1 | 5/2006 | Hotelling et al. |
| 2006/0109252 A1 | 5/2006 | Kolmykov-Zotov et al. |
| 2006/0139339 A1 | 6/2006 | Pechman et al. |
| 2007/0103454 A1 | 5/2007 | Elias |
| 2007/0152976 A1 | 7/2007 | Townsend et al. |
| 2007/0285404 A1 | 12/2007 | Rimon et al. |
| 2008/0012835 A1 | 1/2008 | Rimon et al. |
| 2008/0012838 A1 | 1/2008 | Rimon |
| 2008/0128180 A1 | 6/2008 | Perski et al. |
| 2008/0238885 A1 | 10/2008 | Zachut et al. |
| 2009/0020343 A1 | 1/2009 | Rothkopf et al. |
| 2009/0095540 A1 | 4/2009 | Zachut et al. |
| 2009/0160787 A1 | 6/2009 | Westerman et al. |
| 2009/0251434 A1 | 10/2009 | Rimon et al. |
| 2010/0060608 A1* | 3/2010 | Yousefpor ............. G06F 3/0418 345/174 |
| 2010/0155153 A1 | 6/2010 | Zachut |
| 2010/0156851 A1* | 6/2010 | Kurokawa ............ G06F 3/0412 345/175 |
| 2010/0289752 A1 | 11/2010 | Birkler |
| 2010/0321338 A1 | 12/2010 | Ely |
| 2011/0012840 A1 | 1/2011 | Hotelling et al. |
| 2011/0012855 A1 | 1/2011 | Yeh et al. |
| 2011/0084929 A1 | 4/2011 | Chang et al. |
| 2011/0155479 A1 | 6/2011 | Oda et al. |
| 2011/0175835 A1 | 7/2011 | Wang |
| 2011/0254802 A1 | 10/2011 | Philipp |
| 2011/0254807 A1 | 10/2011 | Perski et al. |
| 2011/0284632 A1* | 11/2011 | Mullen ............... G06Q 20/352 235/380 |
| 2011/0291944 A1 | 12/2011 | Simmons et al. |
| 2011/0310040 A1 | 12/2011 | Ben-Shalom et al. |
| 2012/0050180 A1 | 3/2012 | King et al. |
| 2012/0105362 A1 | 5/2012 | Kremin et al. |
| 2012/0133616 A1 | 5/2012 | Nishihara et al. |
| 2012/0158629 A1 | 6/2012 | Hinckley et al. |
| 2012/0182238 A1 | 7/2012 | Lee |
| 2012/0249457 A1 | 10/2012 | Chou et al. |
| 2013/0009896 A1 | 1/2013 | Zaliva |
| 2013/0009907 A1 | 1/2013 | Rosenberg et al. |
| 2013/0027361 A1 | 1/2013 | Perski et al. |
| 2013/0300696 A1 | 1/2013 | Haran et al. |
| 2013/0127757 A1 | 5/2013 | Mann et al. |
| 2013/0132903 A1 | 5/2013 | Krishnaswamy |
| 2013/0176270 A1 | 7/2013 | Cattivelli et al. |
| 2013/0176280 A1 | 7/2013 | Wu et al. |
| 2013/0249950 A1 | 9/2013 | Mahmoud et al. |
| 2013/0265258 A1 | 10/2013 | Garfinkel et al. |
| 2013/0278543 A1 | 10/2013 | Hsu et al. |
| 2013/0285973 A1 | 10/2013 | Elias et al. |
| 2013/0300668 A1 | 11/2013 | Churikov et al. |
| 2013/0300672 A1 | 11/2013 | Griffin |
| 2013/0328832 A1 | 12/2013 | Boumgarten |
| 2014/0152620 A1 | 6/2014 | Perski et al. |
| 2014/0168116 A1 | 6/2014 | Sasselli et al. |
| 2014/0176447 A1 | 6/2014 | Alameh et al. |
| 2014/0184554 A1 | 7/2014 | Walley |
| 2014/0320445 A1 | 10/2014 | Kim |
| 2015/0049044 A1 | 2/2015 | Yousefpor et al. |
| 2015/0070310 A1 | 3/2015 | Suzuki et al. |
| 2015/0109243 A1* | 4/2015 | Jun ........................ G06F 3/044 345/174 |
| 2015/0177089 A1 | 6/2015 | Ferran et al. |
| 2015/0193025 A1 | 7/2015 | Rebeschi et al. |
| 2016/0041685 A1 | 2/2016 | Perski et al. |
| 2016/0098742 A1 | 4/2016 | Minicucci et al. |
| 2016/0274700 A1 | 9/2016 | Mishalov |
| 2017/0177138 A1 | 6/2017 | Orlovsky et al. |

FOREIGN PATENT DOCUMENTS

| | | |
|---|---|---|
| EP | 0684580 | 11/1995 |
| EP | 1422601 | 5/2004 |
| EP | 1717677 | 11/2006 |
| EP | 2659832 A1 | 11/2013 |
| JP | 05-173698 | 7/1993 |
| JP | 07-311647 | 11/1995 |
| JP | 09-325852 | 12/1997 |
| JP | 10-031545 | 2/1998 |
| JP | 2002-207563 | 7/2002 |
| TW | 201537442 | 10/2015 |
| WO | WO 03/019346 | 3/2003 |
| WO | WO 2005/081631 | 9/2005 |
| WO | WO 2009/108334 | 9/2009 |
| WO | WO 2011/154950 | 12/2011 |
| WO | WO 2012/111010 | 8/2012 |
| WO | WO 2012/140656 | 10/2012 |
| WO | WO 2013/171747 | 11/2013 |
| WO | 2014149243 A1 | 9/2014 |
| WO | WO 2014/145872 | 9/2014 |

OTHER PUBLICATIONS

International Search Report and the Written Opinion dated Jun. 3, 2016 From the International Searching Authority Re. Application No. PCT/US2016/022760.

(56) References Cited

OTHER PUBLICATIONS

Official Action dated Dec. 30, 2016From the US Patent and Trademark Office Re. U.S. Appl. No. 13/892,381. (24 pages).
Applicant-Initiated Interview Summary dated May 2, 2017 From the US Patent and Trademark Office Re. U.S. Appl. No. 13/892,381. (3 pages).
International Search Report and the Written Opinion dated Apr. 11, 2017 From the International Searching Authority Re. Application No. PCT/US2016/066737. (14 Pages).
Written Opinion dated Feb. 1, 2017 From the International Preliminary Examining Authority Re. Application No. PCT/US2016/022760. (8 Pages).
Advisory Action Before the Filing of an Appeal Brief dated Sep. 29, 2016 From the US Patent and Trademark Office Re. U.S. Appl. No. 13/892,381.
Official Action dated Jul. 8, 2016 From the US Patent and Trademark Office Re. U.S. Appl. No. 13/892,381.
International Search Report and the Written Opinion dated May 23, 2006 From the International Searching Authority Re.: Application No. PCT/IL05/00229.
Communication Pursuant to Article 94(3) EPC dated Nov. 13, 2012 From the European Patent Office Re. Application No. 05709125.8.
Communication Pursuant to Article 94(3) EPC dated May 15, 2014 From the European Patent Office Re. Application No. 05709125.8.
Communication Pursuant to Article 94(3) EPC dated Jul. 19, 2012 From the European Patent Office Re. Application No. 05709125.8.
Communication Pursuant to Article 94(3) EPC dated Jun. 20, 2013 From the European Patent Office Re. Application No. 05709125.8.
Communication Pursuant to Article 94(3) EPC dated Nov. 22, 2013 From the European Patent Office Re. Application No. 05709125.8.
Communication Relating to the Results of the Partial International Search dated Sep. 4, 2013 From the International Searching Authority Re. Application No. PCT/IL2013/050417.
Decision to Refuse a European Patent Application (Article 97(2) EPC) dated Jul. 3, 2015 From the European Patent Office Re. Application No. 05709125.8.
International Preliminary Report on Patentability dated Nov. 27, 2014 From the International Bureau of WIPO Re. Application No. PCT/IL2013/050417.
International Search Report and the Written Opinion dated Dec. 20, 2013 From the International Searching Authority Re. Application No. PCT/IL2013/050417.
Notice of Allowance dated Jun. 10, 2015 From the US Patent and Trademark Office Re. U.S. Appl. No. 14/176,289.
Official Action dated Jun. 5, 2012 From the US Patent and Trademark Office Re. U.S. Appl. No. 13/171,601.
Official Action dated Oct. 5, 2015 From the US Patent and Trademark Office Re. U.S. Appl. No. 13/892,381.
Official Action dated Dec. 8, 2009 From the US Patent and Trademark Office Re.: U.S. Appl. No. 11/063,535.
Official Action dated Jan. 13, 2016 From the US Patent and Trademark Office Re. U.S. Appl. No. 13/892,381.
Official Action dated Nov. 15, 2011 From the US Patent and Trademark Office Re. U.S. Appl. No. 13/171,601.
Official Action dated Mar. 18, 2015 From the US Patent and Trademark Office Re. U.S. Appl. No. 13/892,381.
Official Action dated Dec. 22, 2010 From the US Patent and Trademark Office Re.: U.S. Appl. No. 11/063,535.
Official Action dated May 25, 2010 From the US Patent and Trademark Office Re.: U.S. Appl. No. 11/063,535.
Official Action dated May 27, 2009 From the US Patent and Trademark Office Re.: U.S. Appl. No. 11/063,535.
Official Action dated Mar. 28, 2013 From the US Patent and Trademark Office Re. U.S. Appl. No. 13/644,331.
Proceedings Further With the European Patent Application Pursuant to Rule 70(2) EPC dated Apr. 13, 2012 From the European Patent Office Re. Application No. 05709125.8.
Summons to Attend Oral Proceedings Pursuant to Rule 115(1) EPC dated Dec. 15, 2014 From the European Patent Office Re. Application No. 05709125.8.

Supplementary European Search Report dated Mar. 27, 2012 From the European Patent Office Re. Application No. 05709125.8.
Translation of Decision of Rejection dated Jun. 2, 2011 From the Japanese Patent Office Re.: Application No. 2007-500353.
Translation of Notification of Reasons of Rejection dated May 21, 2010 From the Japanese Patent Office Re.: Application No. 2007-500353.
Hughes "Apple's Stylus Receiver Concept Would Improve the Precision of Digital Pen-Based Input", Follow AppleInsider, Quiller Media, 8 P., Jan. 29, 2015.
Park et al. "A Pen-Pressure-Sensitive Capacitive Touch System Using Electrically Coupled Resonance Pen", IEEE Journal of Solid-State Circuits, 51(1): 168-176, Jul. 30, 2015.
Wang et al. "Detecting and Leveraging Finger Orientation for Interaction with Direct-Touch Surfaces", UIST '09 Proceedings of the 22nd Annual ACM Symposium on User Interface Software and Technology: 23-32, Jul. 4, 2009.
Official Action dated Jun. 14, 2017 From the US Patent and Trademark Office Re. U.S. Appl. No. 13/892,381. (26 pages).
Official Action dated Jun. 2, 2017 From the US Patent and Trademark Office Re. U.S. Appl. No. 14/977,721. (38 Pages).
International Preliminary Report on Patentability dated Jun. 6, 2017 From the International Preliminary Examining Authority Re. Application No. PCT/US2016/022760. (9 Pages).
Restriction Official Action dated Aug. 3, 2017 From the US Patent and Trademark Office Re. U.S. Appl. No. 15/070,380. (6 Pages).
Official Action dated Nov. 30, 2017 From the US Patent and Trademark Office Re. U.S. Appl. No. 11/977,721. (31 pages).
Official Action dated Apr. 5, 2018 From the US Patent and Trademark Office Re. U.S. Appl. No. 14/977,721. (21 pages).
Advisory Action Before the Filing of an Appeal Brief dated Feb. 15, 2018 From the US Patent and Trademark Office Re. U.S. Appl. No. 14/977,721.(4 pages).
"AN11623 LPC82x Touch Solution Hardware Design Guide", Retrieved From: https://www.mouser.com/pdfdocs/NXPLPC82xTouchSolutionHardwareDesignGuide.PDF, Dec. 22, 2014, 18 Pages.
"Capacitive Sensing Solutions from Silicon Labs", Retrieved From: https://web.archive.org/web/20140831110204/http://www.silabs.com/Support%20Documents/TechnicalDocs/CapacitiveTouchSenseTechnologySPKR.pdf, Aug. 31, 2014, 53 Pages.
"MTI Instruments Capacitance Measurement Products", Retrieved From: http://www.mtiinstruments.com/technology/Capacitance.aspx, Retrieved on: Jul. 16, 2015, 9 Pages.
"Non Final Office Action Issued in U.S. Appl. No. 15/070,380", dated Jan. 11, 2018, 14 Pages.
Allan, Roger, "How to Select the Right Touch Sensing Approach for Your Design", Retrieved From: http://www.digikey.com/es/articles/techzone/2011/aug/how-to-select-the-right-touch-sensing-approach-for-your-design, Aug. 25, 2011, 4 Pages.
Camacho, et al., "Designing Touch Sensing Electrodes: Electrical Considerations and Recommended Layout Patterns", In Free Semiconductor Application Note, Document No. AN3863, Rev 4, Jul. 2011, 28 Pages.
Carey, John, "Smart Phone Design: Projected Capacitance Fueling Innovation", Retrieved From: https://www.eeweb.com/profile/john-carey/articles/smart-phone-design-projected-capacitance-fueling-innovation, Aug. 18, 2011, 5 Pages.
Goel, et al., "GripSense: Using Built-In Sensors To Detect Hand Posture And Pressure On Commodity Mobile Phones", In Proceedings of the 25th Annual ACM Symposium on User Interface Software and Technology, Oct. 7, 2012, pp. 545-554.
Harrison, et al., "Capacitive Fingerprinting: Exploring User Differentiation by Sensing Electrical Properties of the Human Body", In Proceedings of the 25th annual ACM symposium on User Interface Software and Technology, Oct. 7, 2012, pp. 537-544.
Leigh, et al., "High Rate, Low-Latency Multi-Touch Sensing with Simultaneous Orthogonal Multiplexing", In Proceedings of the 27th annual ACM symposium on User interface software and technology, Oct. 5, 2014, pp. 355-364.

(56) References Cited

OTHER PUBLICATIONS

"Final Office Action Issued in U.S. Appl. No. 14/977,721", dated Nov. 8, 2018, 18 Pages.

* cited by examiner

SYSTEM AND METHOD FOR DETECTING GRIP OF A TOUCH ENABLED DEVICE

BACKGROUND

Capacitive sensors are used touch detection in many Human Interface Devices (HID) such as laptops, trackpads, MP3 players, computer monitors, and smart-phones. The capacitive sensor senses positioning and proximity of a conductive object such as a conductive stylus or finger used to interact with the HID. The capacitive sensor is often integrated with an electronic display to form a touch-screen. Capacitive sensors include antennas or lines constructed from different media, such as copper, Indium Tin Oxide (ITO) and printed ink. ITO is typically used to achieve transparency. Some capacitive sensors are grid based and operate to detect either mutual capacitance between the electrodes at different junctions in the grid or to detect self-capacitance at lines of the grid.

SUMMARY

According to some embodiments of the present disclosure there is a provided a system and method to identify when a user is gripping a touch-enabled computing device. The system and method described herein specifically relate to a touch-enabled computing device that includes a capacitive based digitizer sensor. Touch of a palm or thumb along an edge of the touch-screen together with touch on a chassis of the touch-screen indicates that a user is gripping the touch-enabled device, e.g. the touch screen. Both touch along the edge of touch-screen and touch on the chassis is determined from output sampled from the digitizer sensor. A controller reports a gripping state, e.g. grip or no grip to one or more applications running the computing device, to a computer processing unit (CPU) or a graphical processing unit (GPU) of the computing device. An application may use the report as input for running the application. Optionally, a GPU adjusts positioning of objects displayed on the screen to avoid displaying in areas covered by the part of the hand holding the screen.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
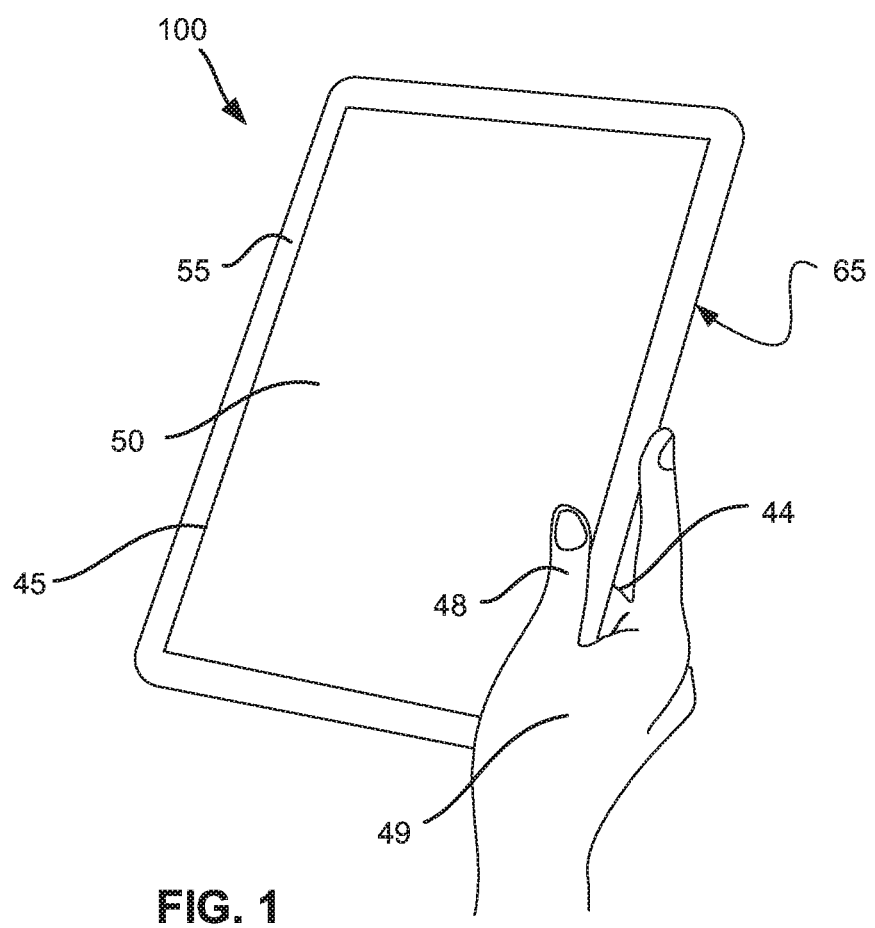
FIG. 1 is a simplified schematic drawing of a user holding a touch-enabled computing device.

FIG. 1 shows a hand 49 gripping a touch-enabled computing device 100. Computing device 100 typically includes a grid based capacitive digitizer sensor 50 integrated on an electronic display 45. Display 45 may include a frame 55 of black print to hide circuitry associated with digitizer sensor 50. When a user grips computing device 100 a thumb 48 is positioned on an edge of display 45 including digitizer sensor 50 and one or more fingers 44 on chassis 65. Chassis 65 is a back face or edge around display 45 and typically includes conductive material. Alternatively, a palm of hand 49 is positioned on an edge of display 45 and a thumb 48 is on chassis 65. A user may also grip computing device 100 with two hands. When two hands are used thumb 48 or palm maybe positioned on two facing edges of display 45 and both hands hold chassis 65.

According to some embodiments of the present disclosure, touch on chassis 65 is detected based on a detected capacitance between a user and computing device 100 and touch on an edge of display 45 is detected based on identifying thumb 48 or palm input along an edge of the digitizer sensor 50. Both the capacitance and thumb 48 or palm input is detected based on output from digitizer sensor 50.

According to some embodiments of the present disclosure, a physical model is defined that relates output from digitizer sensor 50 to capacitance ($C_{BD}$) between the user and the computing device 100. $C_{BD}$ may be monitored during user interaction with computing device 100. A threshold on running averages of detected $C_{BD}$ may be used toggle between defining computing device 100 as being touched or untouched on chassis 65. Optionally, $C_{BD}$ below 250 pF indicates that chassis 65 is untouched and above 250 pF indicates that chassis 65 is touched.

Capacitance between the user and the computing device ($C_{BD}$) may be highly dynamic. High capacitance may be detected when the computing device is well grounded. For example, capacitance above 500 pF may be detected while a user holds a chassis of the computing device and capacitance above 50 pF may be detected while the computing device is connected to an external power source with two prong plug and above 100 pF while the computing device is connected to an external power source with three prong plug. Low capacitance, e.g. below 30 pF may be detected while the computing device is ungrounded. For example, low capacitance may be detected while a computing device is resting on a pillow and disconnected from an external power source.

According to some embodiments of the present disclosure, a gripping state is reported responsive to detecting $C_{BD}$ greater than a defined threshold and thumb 48 or palm input on an edge of digitizer sensor 50.

Figure 2:
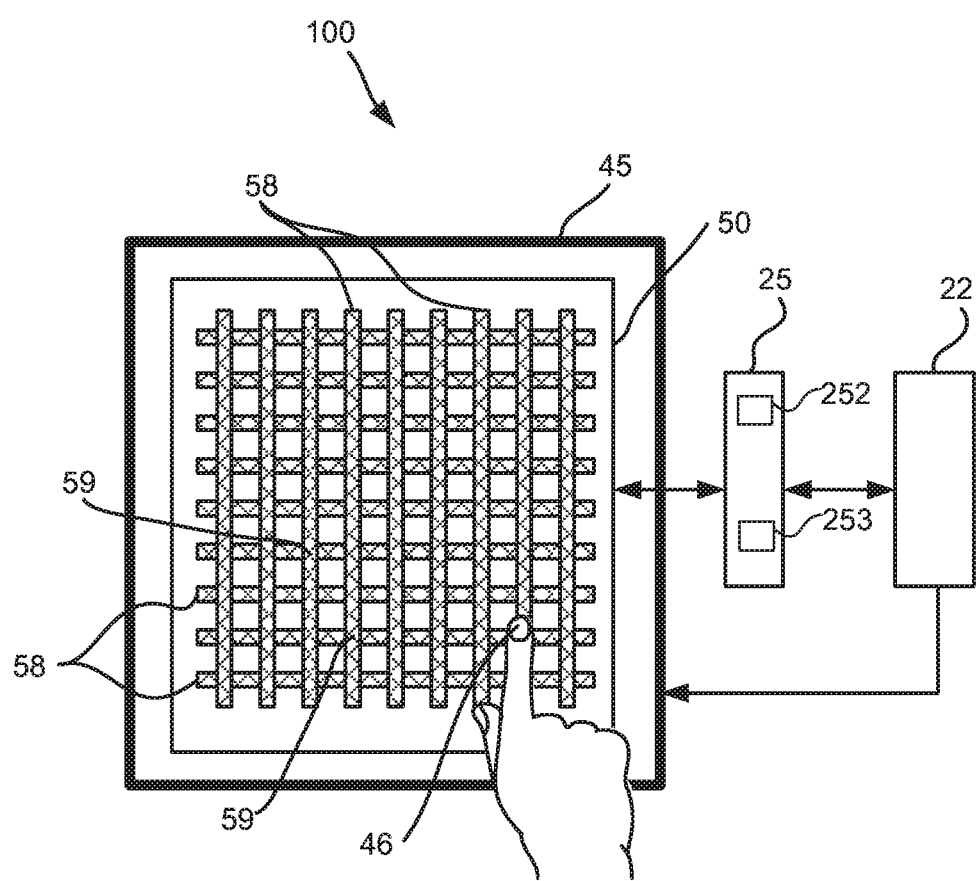
FIG. 2 is a simplified block diagram of an exemplary touch enabled computing device in accordance with some embodiments of the present disclosure.

Reference is now made to FIG. 2 a simplified block diagram of an exemplary touch enabled computing device in accordance with some embodiments of the present disclosure. According to some embodiments of the present disclosure, a computing device 100 includes display 45 integrated with digitizer sensor 50. Digitizer sensor 50 typically includes a matrix formed with parallel conductive material 58 arranged in rows and columns with a capacitive connection in junction areas 59 formed between rows and columns.

Digitizer circuitry 25 applies mutual capacitive detection or a self-capacitive detection for sensing a touch signal from touch of fingertip 46. Bringing a grounded finger 46 (or other part of the hand) close to the surface of digitizer sensor 50 changes the local electrostatic field and reduces the mutual capacitance at junctions 59 in the touched area. A change in mutual capacitance may be detected by a circuit 25 when applying a drive signal along one axis (the drive lines) of the matrix while sampling output on the other axis (the receive lines) to detect a coupled signal. Finger touch has the effect of reducing amplitude of the measured signal.

Output from digitizer sensor 50 may be in the form of a heatmap that maps detected amplitudes of the coupled signals at each junction. In a heatmap, finger touch produces a negative blob at the finger touch location. The change in amplitude of the measured signal due to the finger touch, e.g. the relative effect depends on the ground state of the system. While this system is floating, the relative effect is typically round 15%, e.g. the measured amplitude is 0.85 of the amplitude measured with no touch. While the system is connected to an external power supply, the relative effect may reach 20%, e.g. the measured amplitude is 0.80 of the amplitude measured with no touch. The largest relative may typically be detected while the chassis is touched and may reach 25%, e.g. the measured amplitude is 0.80 of the amplitude measured with no touch.

According to some embodiments of the present disclosure, digitizer circuitry 25 includes a dedicated engine 252 for estimating or determining $C_{BD}$ from the heatmap and a state machine 253 for defining touch or no touch on a chassis of the computing device based on the $C_{BD}$. In some exemplary embodiments, $C_{BD}$ detection engine 252 is associated with memory that stores one or more look-up tables for relating detected touch signals to a level of capacitance between a user with fingertip 46 and device 100. Typically, state machine 253 is also associated with memory for storing parameters, e.g. thresholds, accumulated averages of $C_{BD}$.

Typically, output from digitizer circuitry 25 is reported to host 22. Typically, the output provided by digitizer circuitry 25 may include coordinates of one or more fingertips 46. Optionally, a gripping state, e.g. grip or no grip is reported or $C_{BD}$ is reported. Optionally, palm or thumb touch along an edge of digitizer sensor 50 is reported.

Typically, digitizer circuitry 25 uses both analog and digital processing to process signals detected with digitizer sensor 50. Optionally, some and/or all of the functionalities of $C_{BD}$ detection engine 252 and state machine 253 is integrated in one or more processing units adapted for controlling operation of digitizer sensor 50. Optionally, some and/or all of the functionalities of digitizer circuitry 25, $C_{BD}$ detection engine 252 and state machine 253 is integrated and/or included in host 22.

Figure 3:
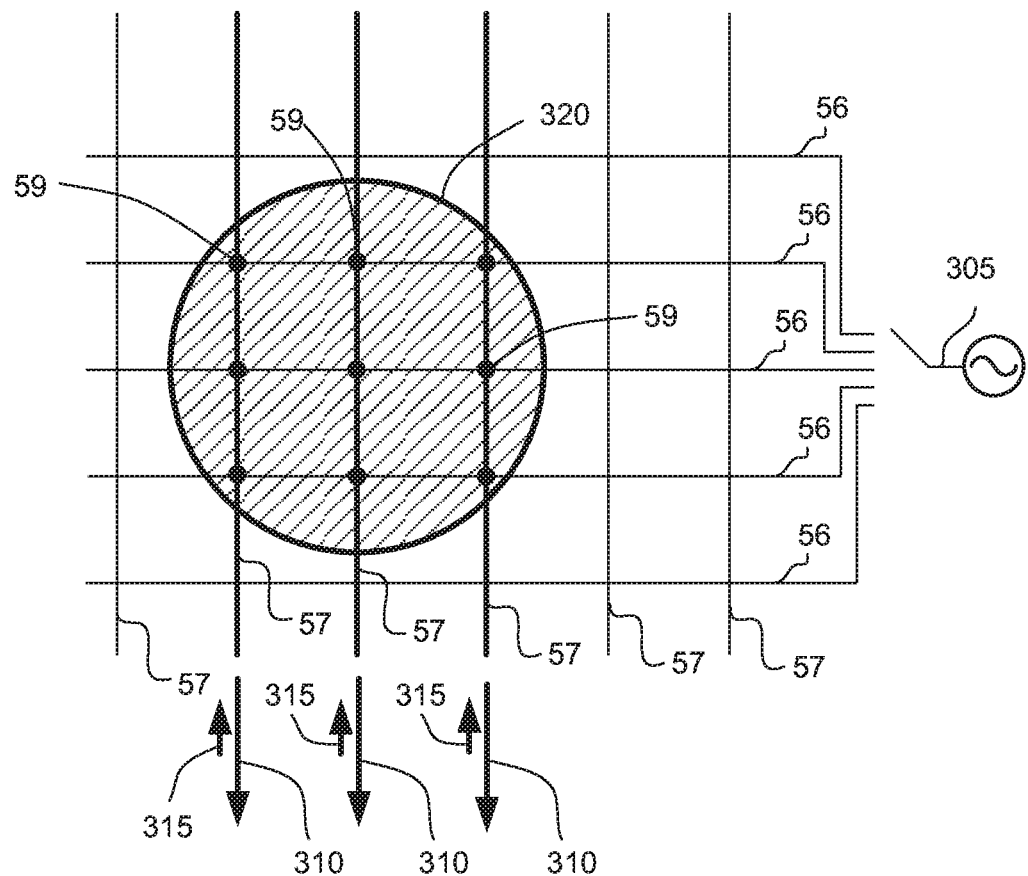
FIG. 3 is a schematic representation of the relative effect on a grid based capacitive sensor with one finger touching the digitizer sensor in accordance with some embodiments of the present disclosure.

Reference is now to FIG. 3 showing a schematic representation of the relative effect on a grid based capacitive sensor with one finger touching the digitizer sensor. The relative effect as defined herein is a difference between baseline amplitude detected with no touch input and an amplitude detected at a touched location. Only a portion of digitizer sensor 50 is shown for simplicity.

A presence of a finger at location 320 reduces mutual capacitance at junctions 59 in location 320. Due to the reduced mutual capacitance, when a drive signal 305 is imposed on drive lines 56, amplitudes detected on the touched receive lines 57 are lower than amplitude detected on other receive lines 57. Reduced amplitudes due to the reduced mutual capacitances are represented by arrows 310. At the same time, potential may be induced on the finger from drive signal 305. This potential may be injected on receive lines 57 which increases amplitudes of the outputs as represented by arrows 315. The output detected from the touched receive lines is therefore a summation of amplitude 310 and amplitude 315. Typically, output detected from a single finger touch produces a negative blob having amplitude that varies based on the magnitude of the induced potential.

Figure 4:
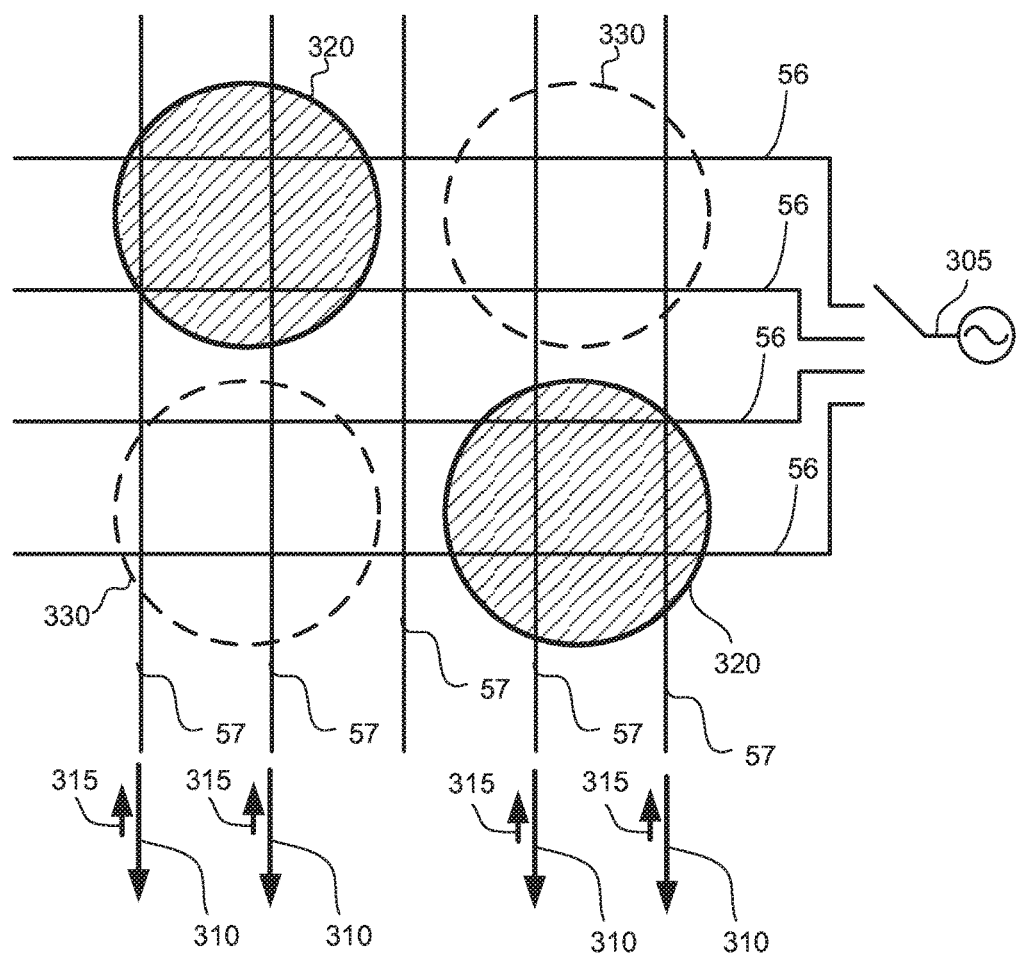
FIG. 4 is a schematic representation of the relative effect on a grid based capacitive sensor when two fingers are touching the digitizer sensor.

When more than one finger is touching the sensing surface or when part of the hand is also touching the sensing surface, the potential induced on one finger or part of the hand spreads to other parts of the digitizer sensor touched by other fingers or other parts of the hand. FIG. 4 shows a schematic representation of the relative effect on a grid based capacitive sensor when two fingers are touching the digitizer sensor. Simultaneous finger touch at locations 320 may lead to a drive signal 305 transmitted on drive lines 56 crossing one location 320 to spread on to receive lines 57 that cross both locations 320. Potential induced on a finger that is not touching the current drive line may introduce positive blob ghosts 330. The induced potential also reduces the relative effect detected at touch locations 320 as discussed in reference to FIG. 3. The effect of the induced potential on the hand may also lead to blob deformation when a relatively large area is touched, e.g. due to palm input or when multiple touches occur in close proximity.

Figure 5:
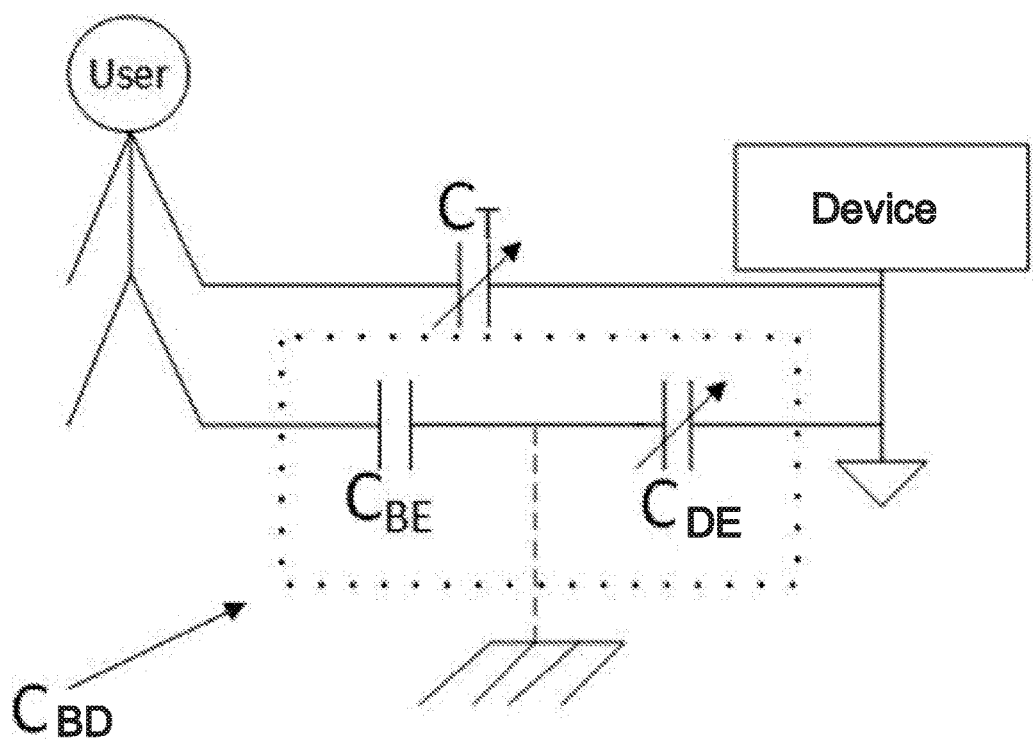
FIG. 5 is a simplified block diagram describing capacitance between a user and a touch enabled computing system in accordance with some embodiments of the present disclosure.

Reference is now made to FIG. 5 showing a simplified block diagram describing capacitance between a user and a touch enabled computing system in accordance with some embodiments of the present disclosure. Capacitance between a user and a touch enabled computing device is defined by touch capacitance ($C_T$) between the user and the digitizer sensor due to a user touching the touch screen, body earth capacitance ($C_{BE}$) between the user and earth ground and device earth capacitance ($C_{DE}$) between the computing device ground and earth ground. CBD is the combination of $C_{BE}$ and $C_{DE}$.

$C_T$ is typically a function of surface contact between the user and the digitizer sensor as well as physical parameters of the touch-screen. $C_T$ increases as more fingers touch the digitizer sensor or due to palm contact and decreases with less contact. In some exemplary embodiments, $C_T$ may be estimated from the heat map based on the following relationship:

$$C_T = (N_{Total})(C_D)  \quad \text{Equation (1)}$$

Where $N_{Total}$ is the number of junctions 59 touched and $C_D$ is a constant that represents capacitance of the device due to both physical properties of the conductive strips 58 and display 45 and also due to proximity between the elements. Optionally, Equation (1) may also include parameters that account for palm touch and size of each finger touch.

$C_{BE}$ is typically ranges between 100-300 pF. $C_{DE}$ can differ between devices based on their constructions and components included in the device. $C_{DE}$ also changes with changing conditions in the surrounding environment. As described herein above, $C_{DE}$ can increase significantly when the device is plugged into a power outlet, connected to another device, or when a user grounds the device by touching its chassis. The capacitance ($C_{BD}$) between the device ground and the user can be defined by:

$$1/C_{BD} = 1/C_{BE} + 1/C_{DE} \quad \text{Equation (2)}$$

And the total capacitance ($C_{Total}$) between the user and the device can be defined by:

$$C_{Total} = C_{BD} + C_T \quad \text{Equation (3)}$$

According to some embodiments of the present invention, $C_{Total}$ may also be estimated based on the detected heatmap using the following relationship:

$$C_{Total} = (N_H)(N_V)(C_E)/P \quad \text{Equation (4)}$$

Where:

$C_E$ is a second constant and can be obtained with empirical data or simulations and represents capacitive coupling at the junctions due to physical properties of the conductive strips 58 and the geometry between them. P is the peak relative effect at a location with a perceived maximum potential induced on the finger from the drive signal. For single finger touch, P is typically peak amplitude at the touch location. In cases where positive blob ghosts are present, P is peak amplitude of the positive blob ghosts. P may also be defined by the following equation:

$$P = FE_G - FE_D \quad \text{Equation (5)}$$

Where:

$FE_G$ is an ideal relative effect that is detected when the computing device has a same impedance to earth ground as the user and $FE_D$ is the detected relative effect; and $N_H$ is a number of touched junctions along a row conductive line crossing the location at which P is detected and $N_V$ is a number of touched junctions along a column conductive line crossing the location of P. $C_{BD}$ can then be estimated based on the following relationship:

$$C_{BD} = (N_H)(N_V)(C_E)/(FE_G - FE_D) - (N_{Total})(C_D) \quad \text{Equation (6)}$$

Where parameters CE, CD and FEG are pre-determined constants and parameters $N_H$, $N_V$, $FE_D$ and $N_{Total}$ are values determined from the sampled heatmap.

Figure 6:
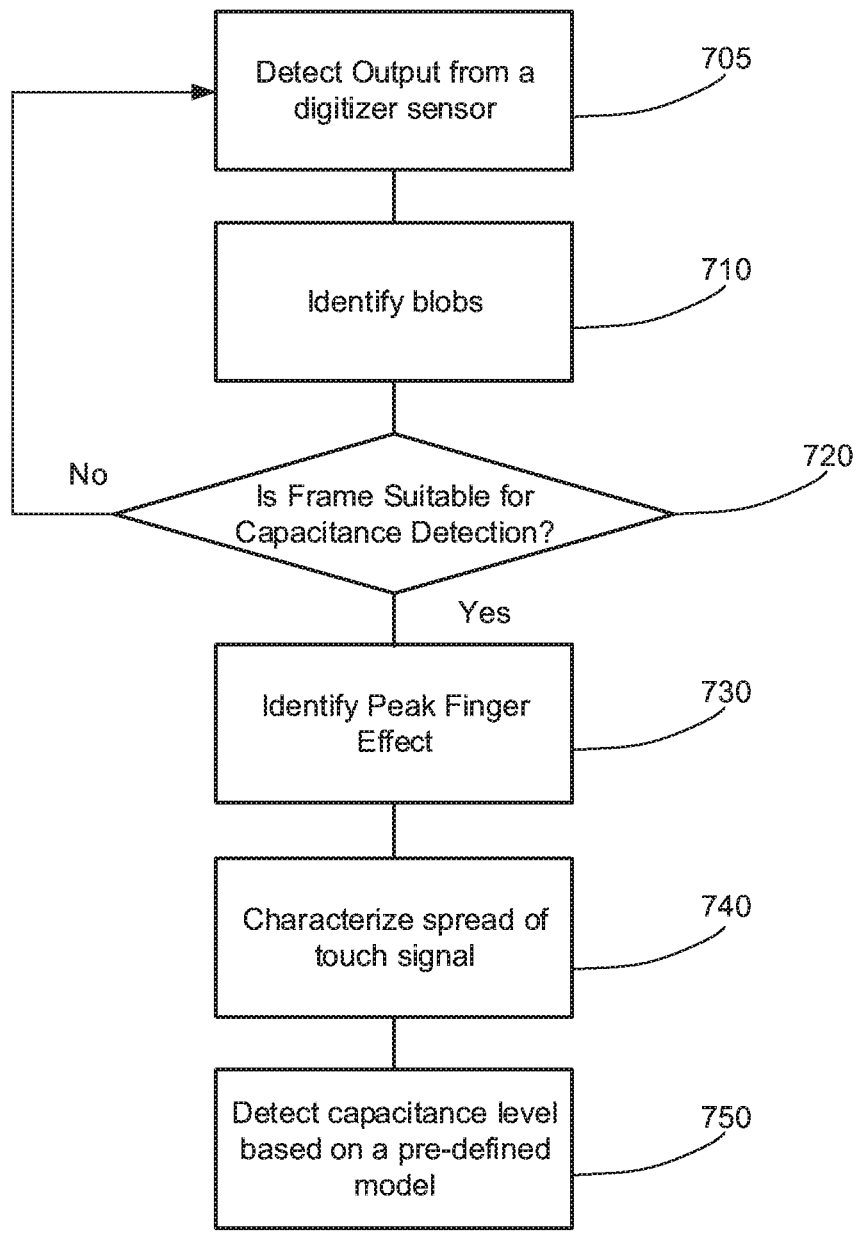
FIG. 6 is a simplified flow chart of an exemplary method detecting capacitance between a user and a touch enabled device in accordance with some exemplary embodiments of the present disclosure.

Reference is now made to FIG. 6 showing a simplified flow chart of an exemplary method detecting capacitance between a user and a touch enabled device in accordance with some exemplary embodiments of the present disclosure. Output from a grid based digitizer sensor is detected while a user is operating a touch enabled computing device (block 705). Optionally, $C_{BD}$ detection is applied once every few frames or optionally on every frame detected. The output detected is touch signals at junctions of a digitizer sensor. A heatmap of the touch signals at each junction may be constructed. A processor or circuit 25 may be programmed to detect blobs, e.g. areas at which touch signals are identified (block 710). In some exemplary embodiments, geometry or characteristics of the blobs are examined to determine if the output from the frame is suitable for detecting $C_{BD}$ based on the defined model (block 720). Typically, frames that include blobs with heavy deformations or blobs with low relative effect are not used for detecting $C_{BD}$.

If the frame is accepted, peak amplitudes of the blobs are detected and a representative blob is selected based on which the model for detecting $C_{BD}$ will be applied (block 730). Parameters $N_V$, $N_H$, and $N_{TOTAL}$ may be determined based on characterization of the spread of the detected touch signals (block 740). Typically, $N_V$, $N_H$, and $N_{TOTAL}$ are parameters that can be extracted from the heatmap. $C_{BD}$ may be estimated based on a pre-defined model relating $C_{BD}$ to FE $N_V$, $N_H$, and $N_{TOTAL}$ (block 750).

Typically, touch on a chassis of the computing device is determined based on average $C_{BD}$ detected over time. Typically an adaptive history buffer is used to update the average $C_{BD}$. $C_{BD}$ may be detected every few frames, e.g. every 3-10 frames during user touch interaction. Optionally, a rate at which $C_{BD}$ is detected depends on a current status of the computing device.

Figure 7:
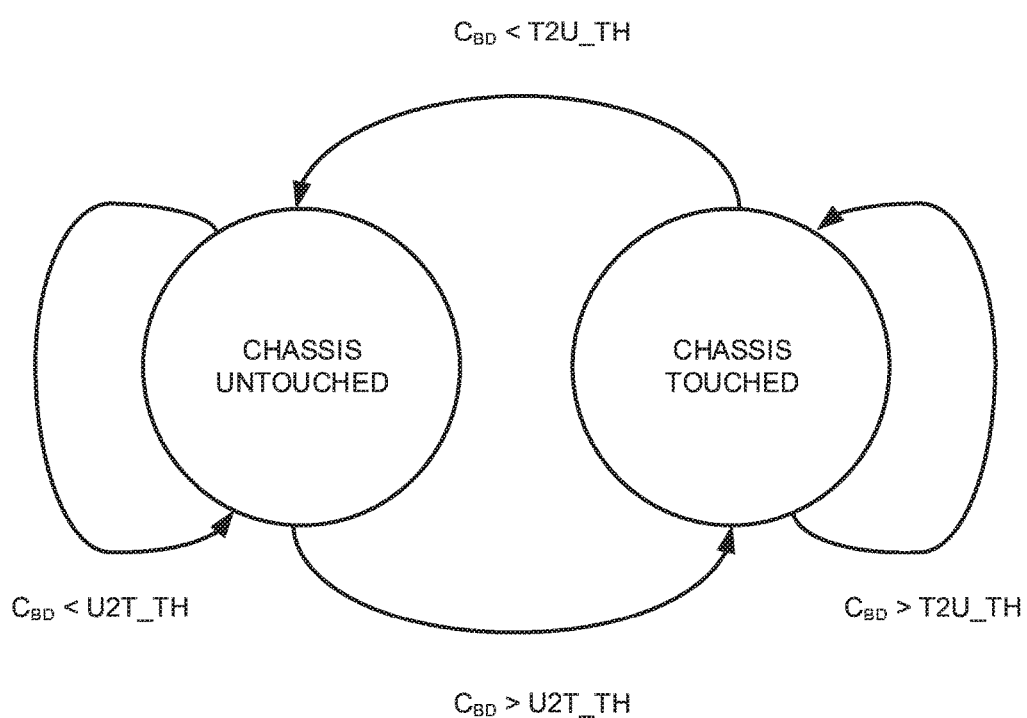
FIG. 7 is a simplified schematic representation of a grounding state machine in accordance with some embodiments of the present disclosure.

Reference is now made to FIG. 7 showing a simplified schematic representation of a state machine in accordance with some embodiments of the present disclosure. Optionally, a chassis of computing device is assumed to be in an untouched while no information is available. After a pre-defined number of $C_{BD}$ detections, the $C_{BD}$ is checked against a first threshold, an untouched to touched threshold (U2T_TH). If $C_{BD}$ is greater than the first threshold, the state changes to 'Touched.' U2T_TH may typically be set to a value above 250 pF, e.g. 400 pF. Average $C_{BD}$ are gathered and as long as $C_{BD}$ does not fall below a second threshold, a touched to untouched threshold (G2T_TH) the state of the machine is maintained. G2U_TH may typically be set to a value below 250 pF, e.g. 150 pF. Once $C_{BD}$ fall below the second threshold the state of the machine is changed to 'Untouched'. Average $C_{BD}$ are gathered and as long as $C_{BD}$ is below (U2T_TH) the state of the machine is maintained. According to some embodiments, a state of the state machine is first defined based on an average of 4-10 $C_{BD}$ detections and then updated using more detections, e.g. 20-50 $C_{BD}$ detections.

Figure 8A:
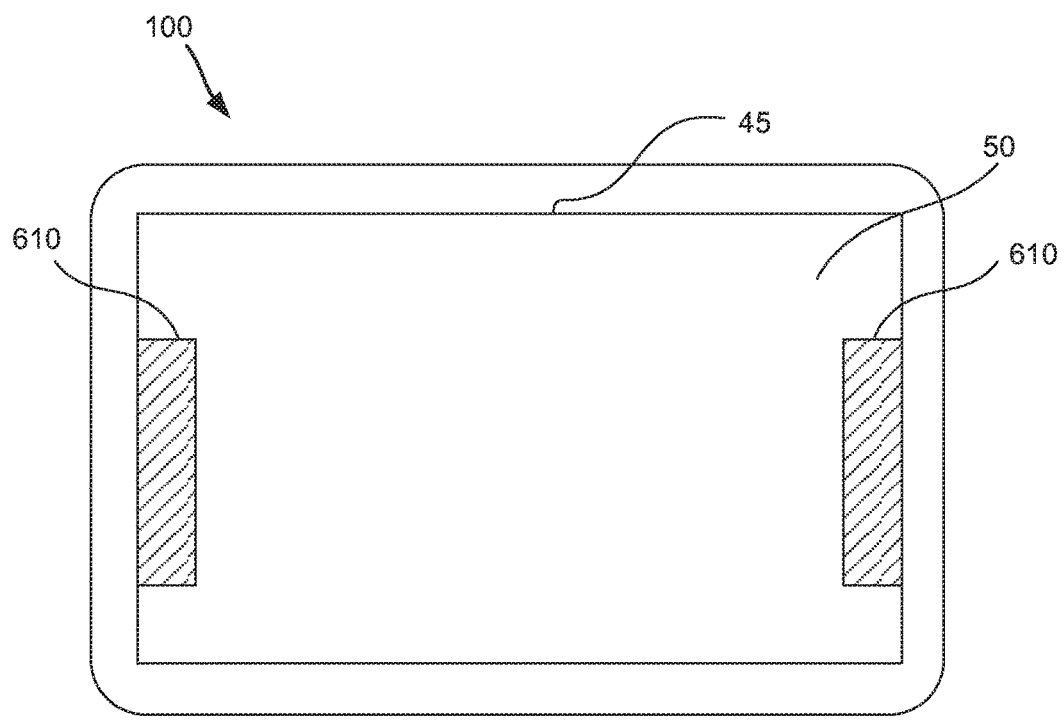
FIGS. 8A, 8B and 8C are simplified drawing illustrating exemplary defined grip areas on a touch screen in accordance with some embodiments of the present disclosure.
Figure 8B:
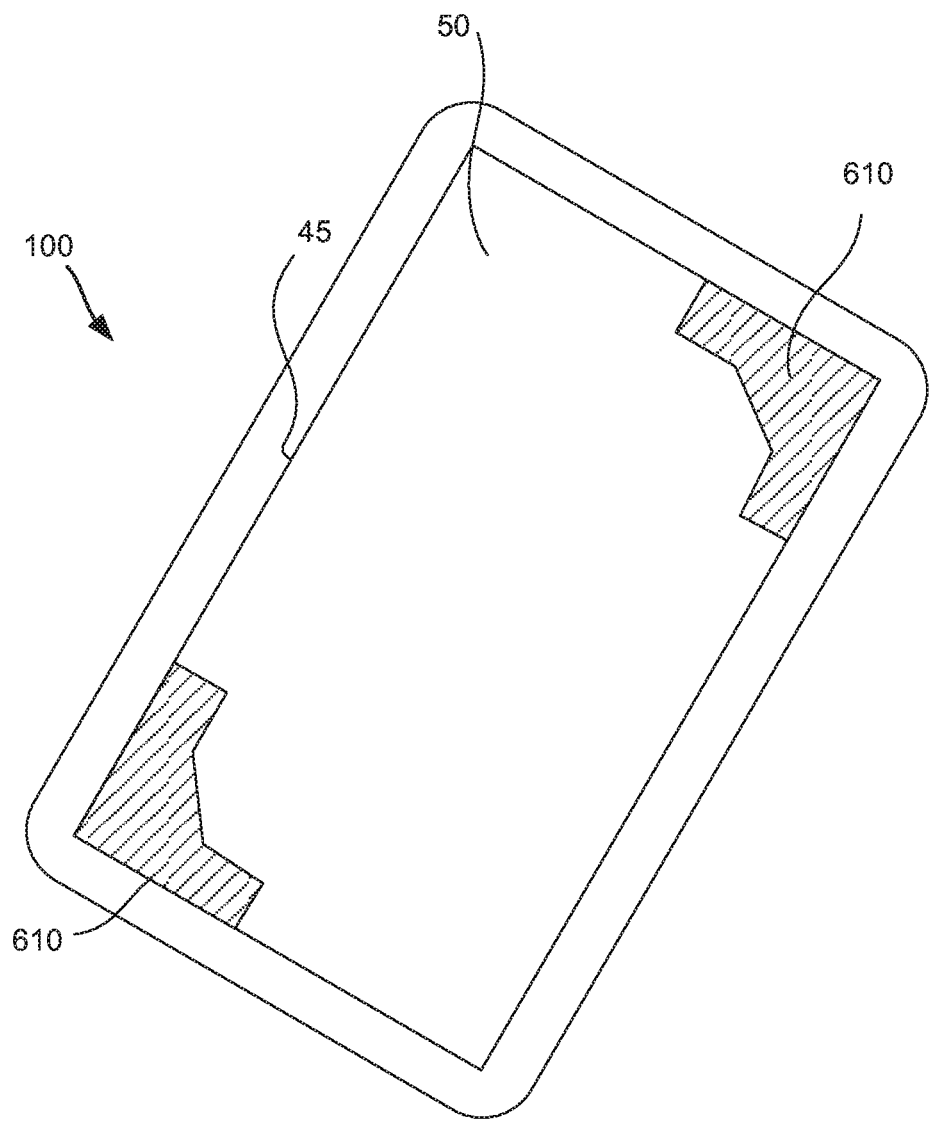
Figure 8C:
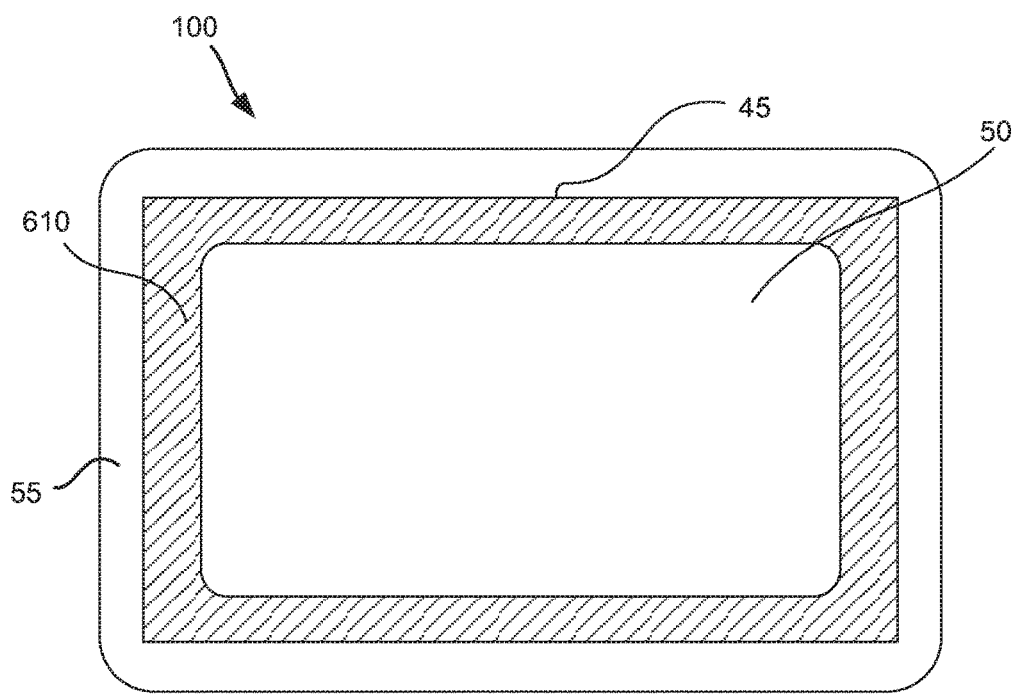

Reference is now made to FIGS. 8A, 8B and 8C showing a simplified drawing illustrating exemplary defined grip areas on a touch screen in accordance with some embodiments of the present disclosure. In some exemplary embodiments, one or more areas 610 associated with gripping are pre-defined. A gripping state may be indicated while a user touches the chassis and places a thumb or a palm in one of areas 610. Thumb or palm touch outside of areas 610 may not be used to indicate gripping. In some exemplary embodiments, areas 610 are areas on a left and right edge of display 45 as shown in FIG. 8A. Optionally, areas 610 are adjusted as display 45 is rotated so that areas 610 will correspond to an area most likely to be gripped by a user (FIG. 8B). In some exemplary embodiments, area 610 is defined as a frame around display 50 and any thumb or palm touch around an edge of digitizer sensor 50 can be used as in indication of gripping.

Figure 9:
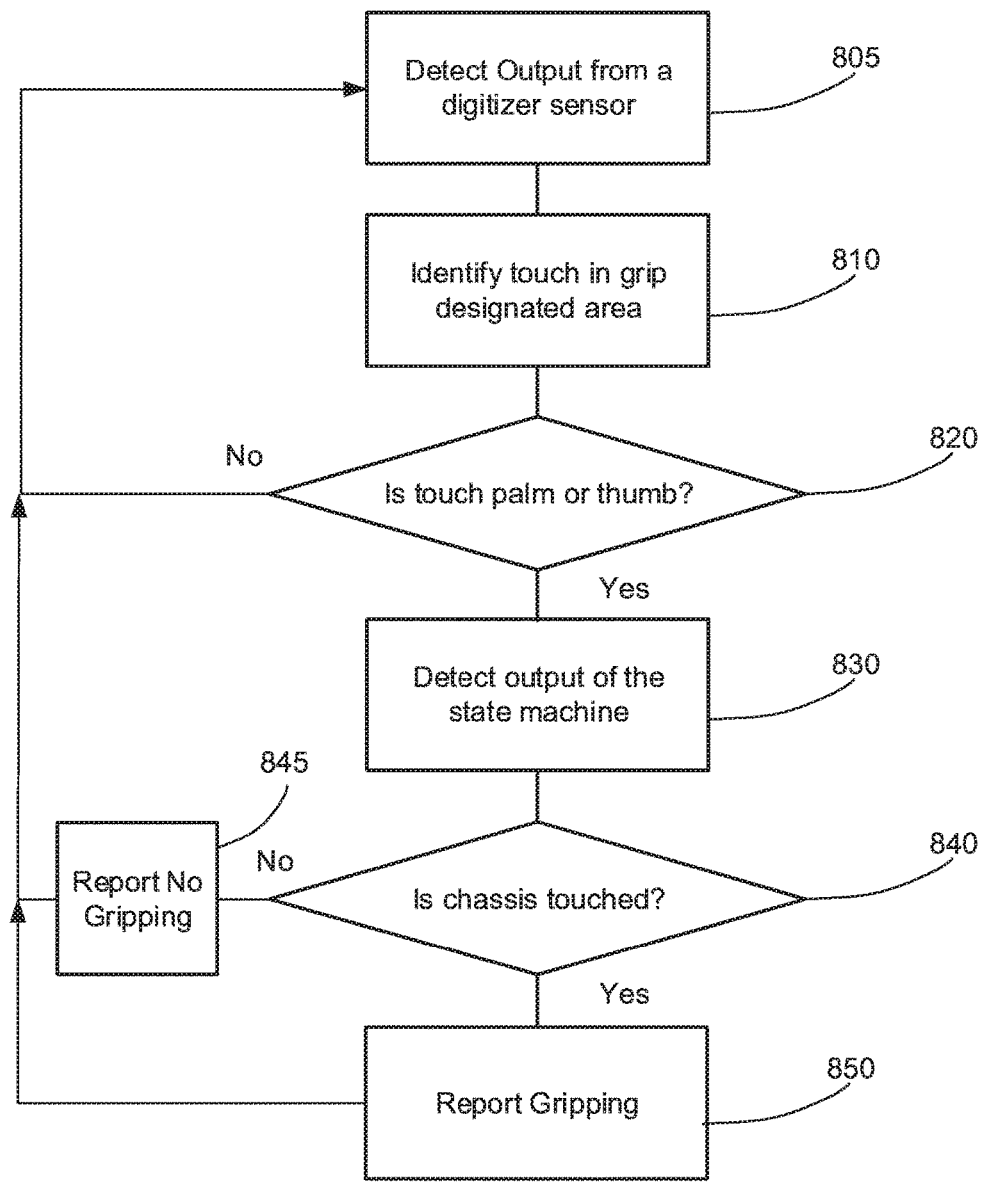
FIG. 9 is a simplified flow chart of an exemplary method for detecting grip of a touch-enabled computing device in accordance with some exemplary embodiments of the present disclosure.

FIG. 9 is a simplified flow chart of an exemplary method for detecting grip of a touch-enabled computing device in accordance with some exemplary embodiments of the present disclosure. Output from a digitizer sensor is detected at a defined refresh rate (block 805). From the output detected, touch input in a grip designated area, e.g. area 610 is identified (block 810). The touch input, e.g. a blob in a heatmap is examined for features related to size and shape to identify if the touch is touch by a thumb or palm (block 820). Typically, an oblong shape or a blob that is larger than a defined size is used as indication of thumb or palm input.

A state of the state machine is also detected for to determine grip (block 830). Optionally, only if thumb or palm input is detected, a current state of the state machine is examined. If a state machine also indicates that the chassis is being touched (block 840), gripping is reported (block 850). If the state machine indicates that the chassis is not being touched no gripping may be reported (block 845). Alternatively, a state machine is not used, and instead accumulated averages of $C_{BD}$ above a defined threshold provides an indication that the chassis is being touched. Typically, this process is repeated over a duration of user interaction with the computing device. Optionally, grip detection is activated by specific command from an application running on the host. In some exemplary embodiments, the state machine is updated throughout user interaction with the computing device and only when the state machine indicates that the chassis is being touched, thumb or palm input in grip designated areas are sought to determine if the computing device is gripped.

According to some exemplary embodiments, there is provided a device comprising: a display; a controller configured to control the display; a sensor integrated with the display, wherein the sensor is configured to sense touch input; and a circuit in communication with the sensor, the circuit configured to: detect when a user is gripping the device only based on output from the sensor and a pre-defined model; and report the gripping detected to the controller.

Optionally, the circuit is configured to: detect when the user is touching a pre-defined portion of the sensor with a thumb or palm based on the output; detect when the user is touching a chassis of the device based on the output; and detect that the user is gripping the device based on detecting that the user is both touching the pre-defined portion with the thumb or the palm and touching the chassis.

Optionally, the sensor is a capacitive based sensor having electrode junctions.

Optionally, the circuit is configured to detect capacitance (CBD) between the device ground and a user touching the sensor based on output from the sensor and the pre-defined model.

Optionally, the model is a physical model for CBD capacitive estimation based on a number of touched junctions and a relative effect, and wherein the number of touched junction and the relative effect is detected from the output sampled.

Optionally, the circuit is configured to detect that the user is touching the chassis based on the CBD detected.

Optionally, the circuit is configured to detect that the user is touching the chassis based on accumulated averages of the CBD being above a pre-defined threshold.

Optionally, the pre-defined portion of the sensor is along at least one edge of the display.

Optionally, the pre-defined portion of the sensor is dynamically adjusted based on an orientation of the display.

Optionally, the report is input to an application running on the device or to a graphical processing unit of the device.

According to some exemplary embodiments, there is provided a method including: detecting output from a sensor integrated with a display of a device, wherein the sensor is configured to sense touch input; and detecting when the user is gripping the device based only on the output and a pre-defined model; and reporting the gripping detected to a controller of the device.

Optionally, the gripping is detected based on detecting from the output that the user is both touching a pre-defined portion of the sensor with a thumb or a palm and touching a chassis of the device.

Optionally, the sensor is a capacitive based sensor having electrode junctions.

Optionally, the method includes detecting capacitance (CBD) between the device ground and a user touching the sensor based on the output from the sensor and the pre-defined model.

Optionally, the model is a physical model for CBD capacitive estimation based on a number of touched junctions and a relative effect, and wherein the number of touched junction and the relative effect is detected from the output sampled.

Optionally, the method includes detecting that the user is touching the chassis based on the CBD detected.

Optionally, the method includes detecting that the user is touching the chassis based on accumulated averages of the CBD being above a pre-defined threshold.

Optionally, the pre-defined portion of the sensor is along at least one edge of the display.

Optionally, the pre-defined portion of the sensor is dynamically adjusted based on an orientation of the display.

Optionally, the report is input to an application running on the device or to a graphical processing unit of the device.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A device comprising:
   a front face and a back face, the back face opposite the front face;
   a display on the front face of the device;
   a controller configured to control the display;
   a grid based capacitive sensor integrated with the display, wherein the sensor is configured to sense touch input on the display; and
   a circuit in communication with the sensor, the circuit configured to:
   perform mutual capacitive detection based on scanning one axis of the grid based capacitive sensor;
   detect a heatmap based on the mutual capacitive detection;
   identify a thumb or palm on a pre-defined portion of the display based on the heatmap;
   detect capacitance ($C_{BD}$) between the user and the device based on the heatmap;
   identify that a user is touching the back face of the device based on accumulated averages of the $C_{BD}$ being above a pre-defined threshold, wherein the accumulated averages are accumulated over a plurality of refresh cycles of the sensor including refresh cycles during which the thumb or palm is on the pre-defined portion of the display;

detect that the user is gripping the device based on identifying the thumb or palm on the pre-defined portion of the display and based on detecting when the user is touching the back face of the device; and report the gripping detected to the controller.

2. The device of claim 1, wherein the $C_{BD}$ is detected based on a number of touched junctions in the heatmap and amplitude of touch junctions in the heatmap.

3. The device of claim 1, wherein the pre-defined portion of the sensor is along at least one edge of the display.

4. The device of claim 1, wherein the pre-defined portion of the sensor is dynamically adjusted based on an orientation of the display.

5. The device of claim 1, wherein the report is input to an application running on the device or to a graphical processing unit of the device.

6. The device of claim 1, wherein the $C_{BD}$ is also detected based on pre-defined constants, wherein the pre-defined constants are related to physical properties of the grid based capacitive sensor and are defined based on empirical data.

7. A method comprising:

performing mutual capacitive detection based on scanning one axis of a grid based capacitive sensor integrated with a display of a device, wherein the display occupies at least a portion of a first surface of the device, wherein the first surface is opposite a second surface of the device, and wherein the sensor is configured to sense touch input on the display;

detecting when the user is touching a pre-defined portion of the display with a thumb or palm based on a heatmap determined from the mutual capacitive detection;

detecting capacitance ($C_{BD}$) between the user and the device based on the heatmap;

detecting when the user is touching the second surface of the device based on accumulated averages of the $C_{BD}$ being above a pre-defined threshold, wherein the accumulated averages are accumulated over a plurality of refresh cycles of the sensor including refresh cycles during which the thumb or palm is on the pre-defined portion of the display;

detecting that the user is gripping the device based on identifying the thumb or palm on the pre-defined portion of the display and based on detecting when the user is touching the back face of the device; and reporting the gripping detected to a controller of the device.

8. The method of claim 7, wherein the $C_{BD}$ is detected based on a number of touched junctions in the heatmap and amplitude of touch junctions in the heatmap.

9. The method of claim 7, wherein the pre-defined portion of the sensor is along at least one edge of the display.

10. The method of claim 7, wherein the pre-defined portion of the sensor is dynamically adjusted based on an orientation of the display.

11. The method of claim 7, wherein the report is input to an application running on the device or to a graphical processing unit of the device.

12. The method of claim 7, wherein the pre-defined threshold is 250 pF.

13. The method of claim 7, wherein the $C_{BD}$ is also detected based on pre-defined constants, wherein the pre-defined constants are related to physical properties of the grid based capacitive sensor and are defined based on empirical data.

14. The method of claim 7, wherein the $C_{BD}$ is also detected based on spatial spread of a touched area on the heatmap.

* * * * *